(12) United States Patent
Heiderich et al.

(10) Patent No.: US 9,033,425 B2
(45) Date of Patent: *May 19, 2015

(54) PICK TOOL AND METHOD FOR MAKING SAME

(71) Applicant: Element Six GmbH, Burghaun (DE)

(72) Inventors: Ernst Heiderich, Hohenroda (DE); Bernd Heinrich Ries, Huenfeld (DE); Frank Friedrich Lachmann, Burghaun (DE)

(73) Assignee: Element Six GMBH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/903,536

(22) Filed: May 28, 2013

(65) Prior Publication Data

US 2013/0307319 A1 Nov. 21, 2013

Related U.S. Application Data

(62) Division of application No. 13/008,271, filed on Jan. 18, 2011.

(60) Provisional application No. 61/296,833, filed on Jan. 20, 2010.

(51) Int. Cl.
*E21C 35/183* (2006.01)
*B23P 11/02* (2006.01)
(Continued)

(52) U.S. Cl.
CPC ......... *E21C 35/183* (2013.01); *Y10T 29/49815* (2015.01); *Y10T 29/49865* (2015.01); *E21C 2035/1806* (2013.01); *B23P 11/027* (2013.01); *E21C 35/19* (2013.01)

(58) Field of Classification Search
CPC .......... E21C 35/183; E21C 2035/1806; E21C 2035/1813
USPC ......... 299/102, 103, 106, 108, 110, 111, 112, 299/113
See application file for complete search history.

(56) References Cited

U.S. PATENT DOCUMENTS

| 3,397,012 A | 8/1968 | Krekeler |
| 3,807,804 A | 4/1974 | Kniff |
| 3,830,321 A | 8/1974 | McKenry et al. |

(Continued)

FOREIGN PATENT DOCUMENTS

| DE | 101 61 713 B4 | 7/2003 |
| DE | 10 2004 057 302 A1 | 6/2006 |

(Continued)

OTHER PUBLICATIONS

Avallone et al., Marks' Standard Handbook for Mechanical Engineers, 1996, McGraw-Hill, 10th ed., p. 8-44.
(Continued)

*Primary Examiner* — David Bagnell
*Assistant Examiner* — Michael Goodwin
(74) *Attorney, Agent, or Firm* — Bryan Cave LLP

(57) ABSTRACT

A pick tool comprising an insert and a steel holder for the insert, the insert comprising a superhard tip joined to a cemented carbide support body having an insertion shank; the steel holder comprising a shaft for connection to a tool carrier and provided with a bore configured for receiving the insertion shank; the volume of the cemented carbide support body being at least 6 cm$^3$.

25 Claims, 13 Drawing Sheets

(51) Int. Cl.
*E21C 35/19* (2006.01)
*E21C 35/18* (2006.01)

(56) References Cited

U.S. PATENT DOCUMENTS

| | | |
|---|---|---|
| 4,289,211 A | 9/1981 | Lumen |
| 4,893,875 A | 1/1990 | Lonn et al. |
| 4,932,723 A | 6/1990 | Mills |
| 4,941,711 A | 7/1990 | Stiffler |
| 4,944,559 A | 7/1990 | Sionnet et al. |
| 5,150,636 A | 9/1992 | Hill |
| 5,161,627 A | 11/1992 | Burkett |
| 5,370,448 A | 12/1994 | Sterwerf, Jr. |
| 5,453,105 A | 9/1995 | Middlemiss et al. |
| 5,551,760 A | 9/1996 | Sollami |
| 5,573,308 A | 11/1996 | Simons et al. |
| 5,683,144 A | 11/1997 | Kammerer et al. |
| 5,823,632 A | 10/1998 | Burkett |
| 5,931,542 A | 8/1999 | Britzke et al. |
| 5,967,431 A | 10/1999 | Stafford et al. |
| 6,051,079 A | 4/2000 | Andersson et al. |
| 6,102,486 A | 8/2000 | Briese |
| 6,123,279 A | 9/2000 | Stafford et al. |
| 6,170,917 B1 | 1/2001 | Heinrich et al. |
| 6,173,798 B1 | 1/2001 | Bryant et al. |
| 6,176,552 B1 | 1/2001 | Topka, Jr. et al. |
| 6,179,886 B1 | 1/2001 | Gordeev et al. |
| 6,186,597 B1 | 2/2001 | Hahn et al. |
| 6,199,956 B1 | 3/2001 | Kammerer |
| 6,428,111 B1 | 8/2002 | Kammerer |
| 6,447,852 B1 | 9/2002 | Gordeev et al. |
| 6,554,369 B2 | 4/2003 | Sollami |
| 6,592,304 B1 | 7/2003 | Kammerer |
| 6,601,475 B2 | 8/2003 | Davies et al. |
| 6,619,756 B1 | 9/2003 | Holl et al. |
| 6,685,273 B1 | 2/2004 | Sollami |
| 6,709,747 B1 | 3/2004 | Gordeev et al. |
| 6,733,087 B2 | 5/2004 | Hall et al. |
| 6,786,557 B2 | 9/2004 | Montgomery, Jr. |
| 6,913,636 B2 | 7/2005 | Defrancesco et al. |
| 6,919,040 B2 | 7/2005 | Fries et al. |
| 6,932,172 B2 | 8/2005 | Dvorachek |
| 7,008,672 B2 | 3/2006 | Gordeev et al. |
| 7,192,095 B2 | 3/2007 | Sansone et al. |
| 7,210,744 B2 | 5/2007 | Montgomery, Jr. |
| 7,320,505 B1 | 1/2008 | Hall et al. |
| 7,338,135 B1 | 3/2008 | Hall et al. |
| 7,353,893 B1 | 4/2008 | Hall et al. |
| 7,384,105 B2 | 6/2008 | Hall et al. |
| 7,384,443 B2 | 6/2008 | Mirchandani |
| 7,387,345 B2 | 6/2008 | Hall et al. |
| 7,390,066 B2 | 6/2008 | Hall et al. |
| 7,396,086 B1 | 7/2008 | Hall et al. |
| 7,401,863 B1 | 7/2008 | Hall et al. |
| 7,410,221 B2 | 8/2008 | Hall et al. |
| 7,413,256 B2 | 8/2008 | Hall et al. |
| 7,445,294 B2 | 11/2008 | Hall et al. |
| 7,464,993 B2 | 12/2008 | Hall et al. |
| 7,469,756 B2 | 12/2008 | Hall et al. |
| 7,469,971 B2 | 12/2008 | Hall et al. |
| 7,469,972 B2 | 12/2008 | Hall et al. |
| 7,475,948 B2 | 1/2009 | Hall et al. |
| 7,523,794 B2 | 4/2009 | Hall et al. |
| 7,530,642 B2 | 5/2009 | Ferreri et al. |
| 7,537,288 B2 | 5/2009 | Chiang |
| 7,568,770 B2 | 8/2009 | Hall et al. |
| 7,588,102 B2 | 9/2009 | Hall et al. |
| 7,594,703 B2 | 9/2009 | Hall et al. |
| 7,597,402 B2 | 10/2009 | Tewes et al. |
| 7,600,823 B2 | 10/2009 | Hall et al. |
| 7,618,098 B2 | 11/2009 | Frear |
| 7,635,168 B2 | 12/2009 | Hall et al. |
| 7,648,314 B2 | 1/2010 | Weaver |
| 7,661,765 B2 | 2/2010 | Hall et al. |
| 7,665,552 B2 | 2/2010 | Hall et al. |
| 7,669,674 B2 | 3/2010 | Hall et al. |
| 7,681,669 B2 | 3/2010 | Cannon et al. |
| RE41,248 E | 4/2010 | Palmqvist et al. |
| 7,690,138 B2 | 4/2010 | Hall et al. |
| 7,926,597 B2 | 4/2011 | Majagi et al. |
| 2003/0132660 A1 | 7/2003 | Holl et al. |
| 2006/0119165 A1 | 6/2006 | Holl et al. |
| 2007/0251732 A1 | 11/2007 | Mirchandani et al. |
| 2007/0290545 A1 | 12/2007 | Hall et al. |
| 2008/0035383 A1 | 2/2008 | Hall et al. |
| 2008/0036277 A1 | 2/2008 | Hall et al. |
| 2008/0041993 A1 | 2/2008 | Hall et al. |
| 2008/0048484 A1 | 2/2008 | Hall et al. |
| 2008/0063476 A1 | 3/2008 | Hall et al. |
| 2008/0088172 A1 | 4/2008 | Hall et al. |
| 2008/0099250 A1 | 5/2008 | Hall et al. |
| 2008/0115977 A1 | 5/2008 | Hall et al. |
| 2008/0115978 A1 | 5/2008 | Hall et al. |
| 2008/0169698 A1 | 7/2008 | Hall et al. |
| 2008/0197691 A1 | 8/2008 | Hall et al. |
| 2008/0210798 A1 | 9/2008 | Hall et al. |
| 2008/0211290 A1 | 9/2008 | Hall et al. |
| 2008/0258536 A1 | 10/2008 | Hall et al. |
| 2008/0289880 A1 | 11/2008 | Majagi et al. |
| 2009/0051211 A1 | 2/2009 | Hall et al. |
| 2009/0058174 A1 | 3/2009 | Hall et al. |
| 2009/0066149 A1 | 3/2009 | Hall et al. |
| 2009/0108664 A1 | 4/2009 | Hall et al. |
| 2009/0133938 A1 | 5/2009 | Hall et al. |
| 2009/0160238 A1 | 6/2009 | Hall et al. |
| 2009/0184564 A1 | 7/2009 | Brady |
| 2009/0267403 A1 | 10/2009 | Hall et al. |
| 2009/0273224 A1 | 11/2009 | Hall et al. |
| 2009/0273225 A1 | 11/2009 | Hall et al. |
| 2009/0294182 A1 | 12/2009 | Hall et al. |
| 2010/0065338 A1 | 3/2010 | Hall et al. |
| 2010/0065339 A1 | 3/2010 | Hall et al. |
| 2010/0071964 A1 | 3/2010 | Hall et al. |
| 2011/0080036 A1 | 4/2011 | Hall et al. |
| 2012/0080931 A1 | 4/2012 | Wang |
| 2012/0261977 A1 | 10/2012 | Hall et al. |

FOREIGN PATENT DOCUMENTS

| | | |
|---|---|---|
| EP | 0096585 A1 | 12/1983 |
| EP | 0157625 A2 | 10/1985 |
| EP | 0236086 A1 | 9/1987 |
| EP | 0425552 B1 | 5/1991 |
| EP | 0428599 B1 | 5/1991 |
| EP | 0656989 A1 | 6/1995 |
| EP | 0706606 A1 | 4/1996 |
| EP | 0842349 B1 | 5/1998 |
| EP | 1017499 B1 | 7/2000 |
| EP | 1159511 B1 | 12/2001 |
| EP | 1733120 B1 | 12/2006 |
| EP | 1761682 A1 | 3/2007 |
| GB | 2211875 A | 7/1989 |
| GB | 2249116 A | 4/1992 |
| GB | 2258876 A | 2/1993 |
| GB | 2273513 A | 6/1994 |
| WO | 00/20722 A2 | 4/2000 |
| WO | 2008/105915 A2 | 9/2008 |
| WO | 2009/006612 A1 | 1/2009 |
| WO | 2009/013713 A2 | 1/2009 |
| WO | 2009/053903 A2 | 4/2009 |
| WO | 2009/089322 A1 | 7/2009 |
| WO | 2009/142577 A1 | 11/2009 |

OTHER PUBLICATIONS

Brookes, World Directory and Handbook of Hardmetals and Hard Materials, 6th Ed., International Carbide Data, 1996, pp. 95-102.

International Standard ISO 28079, Hardmetals—Palmqvist toughness test, Jul. 15, 2009.

Roebuck, Int. J. of Refractory Metals & Hard Metals 14 (1996), p. 419-424.

Sandvik Hard Materials, "Understanding Cemented Carbide" 2005.

Sandvik Hard Materials "Cemented Carbide, Sandvik new developments and applications" 2001.

PICK TOOL AND METHOD FOR MAKING SAME

This application claims the benefit of U.S. Provisional Application No. 61/296,833 filed Jan. 20, 2010, the disclosure of which is incorporated herein by reference in its entirety.

BACKGROUND

Embodiments of the invention relate generally to pick tools comprising a superhard tip, particularly but not exclusively degrading hard or abrasive bodies, such as rock, asphalt, coal or concrete, for example, and to a method for making same.

Pick tools may be used for breaking, boring into or otherwise degrading structures or bodies, such as rock, asphalt, coal or concrete and may be used in applications such as mining, construction and road reconditioning. For example, in road reconditioning operations, a plurality of pick tools may be mounted on a rotatable drum and caused to break up road asphalt as the drum is rotated. A similar approach may be used to break up rock formations such as in coal mining. Some pick tools may comprise a working tip comprising synthetic diamond material, which is likely to have better abrasion resistance than working tips formed of cemented tungsten carbide material. However, synthetic and natural diamond material tends to be more brittle and less resistant to fracture than cemented carbide material and this tends to reduce its potential usefulness in pick operations. There is a need to provide a pick tool having longer working life.

United States patent application publication number 2008/0035383 discloses a high impact resistant tool having a superhard material bonded to a cemented metal carbide substrate, the cemented metal carbide substrate being bonded to a front end of a cemented metal carbide segment, which has a stem formed in the base end, the stem being press fit into a bore of a steel holder. The steel holder is rotationally fixed to a drum adapted to rotate about an axis.

SUMMARY

Viewed from a first aspect, there can be provided a pick tool (also referred to as a superhard pick tool) comprising an insert (also referred to as a pick insert) mounted in a steel holder, the insert comprising a superhard tip joined to a cemented carbide support body at an end of the support body, the support body comprising an insertion shank (also referred to simply as a shank); the steel holder having a bore configured to accommodate the insertion shank and comprising a shaft configured for mounting the steel holder onto a tool carrier; such as a pick driver apparatus; the volume of the cemented carbide support body being at least 6 cm³, at least 10 cm³ or at least 15 cm³. The insertion shank may be shrink-fitted within the bore. Viewed from another aspect there can be provided a kit of components for the present pick tool, the kit being in an unassembled or partly assembled state.

Viewed from a second aspect, there can be provided a method for making a pick tool, the method including providing an insert and a steel holder for the insert, the insert comprising a superhard tip joined to a cemented carbide support body having an insertion shank; the steel holder comprising a shaft for connection to a tool carrier, and provided with a bore for receiving the insertion shank; the insertion shank having a volume of at least 15 cm³; and shrink fitting the insertion shank into the bore of the steel holder.

Viewed from a third aspect, there can be provided a method of disassembling a pick tool, the method including heating the steel holder to expand the bore and withdrawing the insertion shank from the bore.

BRIEF INTRODUCTION TO THE DRAWINGS

Non-limiting example arrangements to illustrate the present disclosure are described hereafter with reference to the accompanying drawings, of which:

The same reference numbers refer to the same general features in all drawings.

DETAILED DESCRIPTION

Figure 1A:
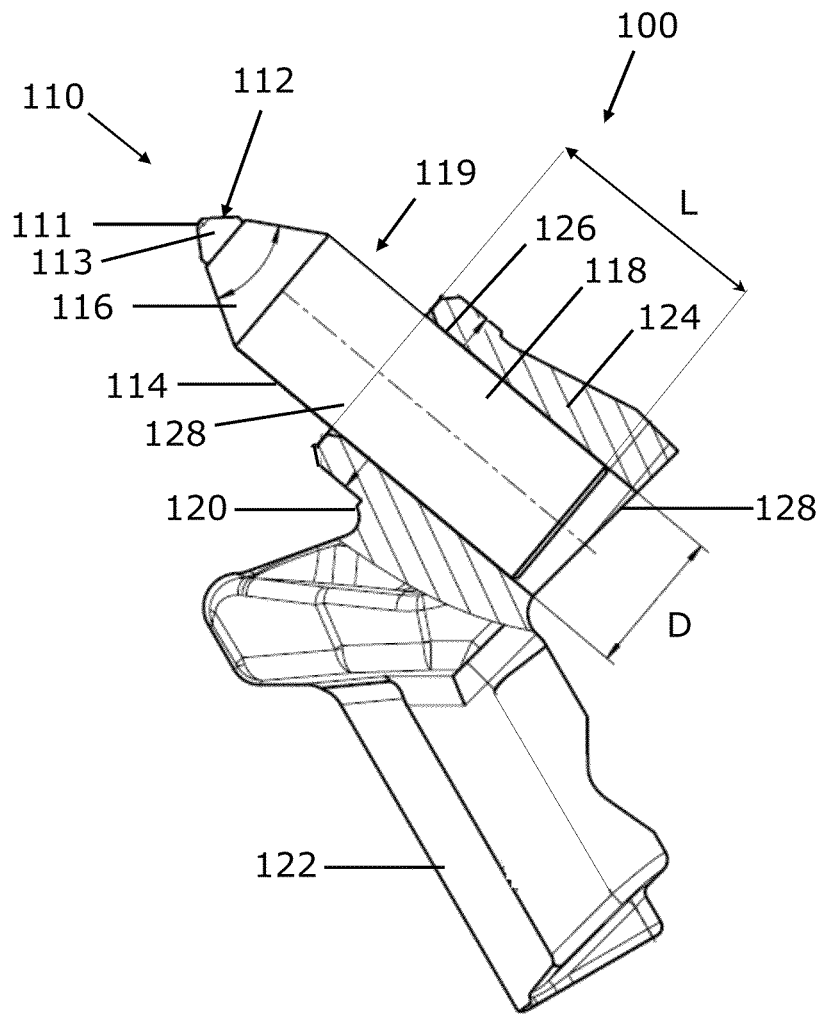
FIG. 1A shows a schematic partially cut-away side view of an example of a pick tool.
Figure 1B:
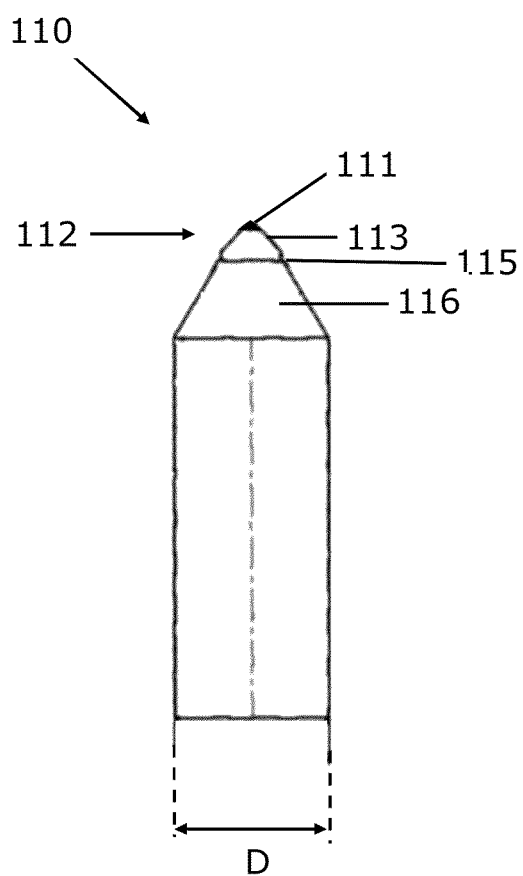
FIG. 1B shows a schematic side view of the pick insert of the example pick tool shown in FIG. 1A.
Figure 1C:
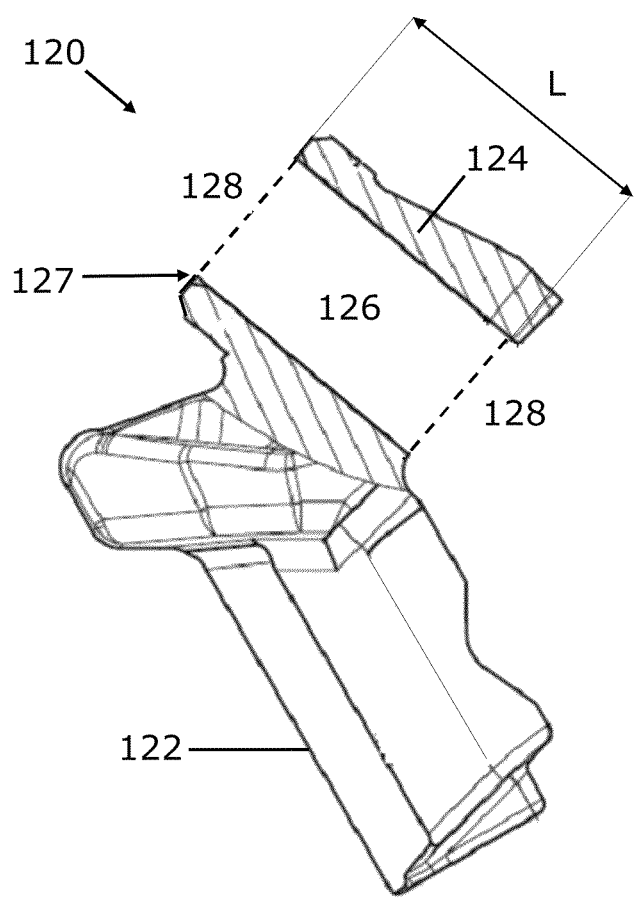
FIG. 1C shows a partially cut-away perspective view of the steel holder of the example pick tool shown in FIG. 1A.

As used herein, "superhard" means a Vickers hardness of at least 25 GPa, and a superhard tool, insert or component means a tool, insert or component comprising a superhard material.

Synthetic and natural diamond, polycrystalline diamond (PCD), cubic boron nitride (cBN) and polycrystalline cBN (PCBN) material are examples of superhard materials. As used herein, synthetic diamond, which is also called man-made diamond, is diamond material that has been manufactured. As used herein, polycrystalline diamond (PCD) material comprises a mass (an aggregation of a plurality) of diamond grains, a substantial portion of which are directly inter-bonded with each other and in which the content of diamond is at least about 80 volume percent of the material. Interstices between the diamond grains may be at least partly filled with a binder material comprising a catalyst material for synthetic diamond, or they may be substantially empty. As used herein, a catalyst material for synthetic diamond is capable of promoting the growth of synthetic diamond grains and or the direct inter-growth of synthetic or natural diamond grains at a temperature and pressure at which synthetic or natural diamond is thermodynamically stable. Examples of catalyst materials for diamond are Fe, Ni, Co and Mn, and certain alloys including these. Bodies comprising PCD material may comprise at least a region from which catalyst material has been removed from the interstices, leaving interstitial voids between the diamond grains. As used herein, PCBN material comprises grains of cubic boron nitride (cBN) dispersed within a matrix comprising metal or ceramic material.

Other examples of superhard materials include certain composite materials comprising diamond or cBN grains held together by a matrix comprising ceramic material, such as silicon carbide (SiC), or cemented carbide material, such as Co-bonded WC material (for example, as described in U.S. Pat. No. 5,453,105 or 6,919,040). For example, certain SiC-bonded diamond materials may comprise at least about 30 volume percent diamond grains dispersed in a SiC matrix (which may contain a minor amount of Si in a form other than SiC). Examples of SiC-bonded diamond materials are described in U.S. Pat. Nos. 7,008,672; 6,709,747; 6,179,886; 6,447,852; and International Application publication number WO2009/013713).

Example arrangements of pick tools for degrading hard or abrasive bodies or structures are described with reference to FIG. 1A to FIG. 6.

Examples of pick tools 100 comprise an insert 110 and a steel holder 120 for the insert 110. The insert 110 comprises a superhard tip 112 joined to a cemented carbide support body 114 comprising an insertion shank 118. In these examples, the insertion shanks 118 are generally cylindrical in shape and have a mean diameter D, the superhard tips 112 comprise respective PCD structures 111 bonded to cemented carbide substrates 113, which are joined to respective support bodies 114 at respective interfaces 115 by means of braze material, and the support bodies 114 have generally frusto-conical portions 116 to which the superhard tips 112 are brazed. The steel holders 120 comprise shafts 122 for connection to a pick drum device (not shown), and a bore 126 are configured for shrink-fitting the insertion shanks 118. The steel holders 120 may be provided with respective insert receiver members 124 in which the bores 126 are formed.

At least a portion of the insertion shank 118 may be secured within the bore 126 by means of a shrink fit. As used herein, a shrink fit is a kind of interference fit between components achieved by a relative size change in at least one of the components (the shape may also change somewhat). This is usually achieved by heating or cooling one component before assembly and allowing it to return to the ambient temperature after assembly. Shrink-fitting is understood to be contrasted with press-fitting, in which a component is forced into a bore or recess within another component, which may involve generating substantial frictional stress between the components.

Shrink-fitting is likely to result in a region (not indicated) of the steel holder 120 adjacent the bore 126 being in a static state of circumferential tensile stress. In some examples of pick tools, a region within the steel holder adjacent the bore may be in a state of circumferential (or hoop) static tensile stress of at least about 300 MPa or at least about 350 MPa, and in some pick tools, the circumferential static tensile stress may be at most about 450 MPa or at most about 500 MPa. As used herein, the static stress state of a tool or element refers to the stress state of the tool or element under static conditions, such as may exist when the tool or element is not in use.

In some example pick tools, a portion 119 of the support body 114, including the frusto-conical portion 116, may protrude from the steel holder 120 and extend beyond a mouth 128 of the bore 126. In some examples, the diameter of the protruding portion 119 along the entire length of the protruding portion may be at most about 5% greater, or substantially no greater than the mean diameter D of the bore 126. In the examples illustrated in FIG. 1A to FIG. 6, the diameter of the protruding portion 119 does not substantially exceed that of the bore 126.

In one embodiment, a collar encloses at least part of a protruding portion of the cemented carbide support body, and in one embodiment the collar may be shrink-fitted onto the protruding portion. In one embodiment, the collar has lower hardness and abrasive wear resistance than cemented carbide, and in one embodiment the collar comprises steel. In one example, the collar is joined to the steel holder by means of brazing. The collar may provide support or protection for the cemented carbide support body.

Figure 2:
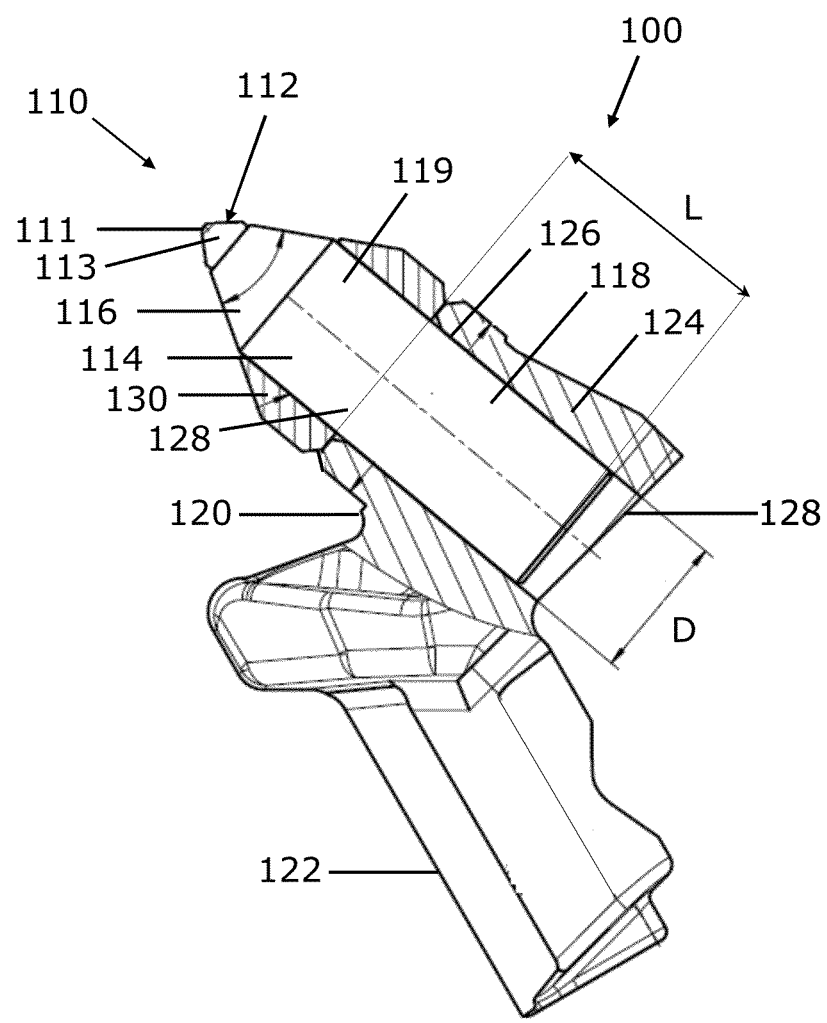
FIG. 2 shows a schematic partially cut-away side view of an example of a pick tool.
Figure 4:
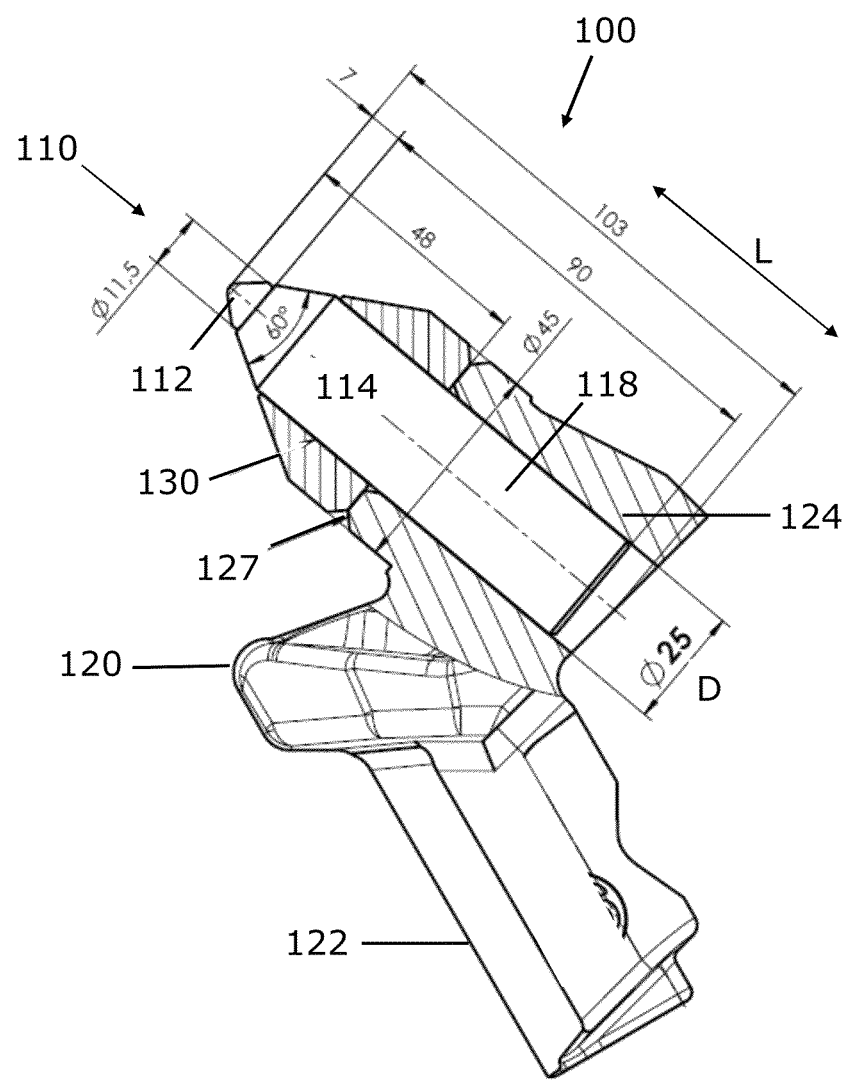
FIG. 4 shows a schematic partially cut-away side view of an example of a pick tool, in which dimensions are in millimeters.

With reference to the example pick tool variants shown in FIG. 2 and FIG. 4, a collar 130 encloses part of the protruding portion 119 of the support body 114. The collar 130 may enclose at least part of the protruding portion 119, and in one example the collar 130 may be shrink-fitted onto the protruding portion. The collar 130 may have lower hardness and abrasive wear resistance than cemented carbide and may comprise steel. In one embodiment, the collar 130 is joined to the steel holder 120 by means of brazing. The collar 130 may provide support or protection for the cemented carbide support body 114. The collar 130 may have various shapes, such as generally conical or generally rounded, and it may be substantially symmetrical or non-symmetrical. At least part of the outer surface of the collar 130 may be protected by means of a wear protective hard facing (not shown), for example a layer or sleeve comprising tungsten carbide. In particular, at least a part 127 of the outer surface of the steel holder 120 adjacent the mouth 128 of the bore 126, for example a surface region of the insert receiver member 124 extending up to 20 mm from the mouth 127, may be protected by means of a wear protective means (not shown). Examples of such means may be a layer or sleeve comprising tungsten carbide and/or grains of superhard material such as diamond or cBN. In one example embodiment, the collar 130 may have a protective hard facing disposed mainly or only on a side that would be exposed to greater wear in use.

Figure 3:
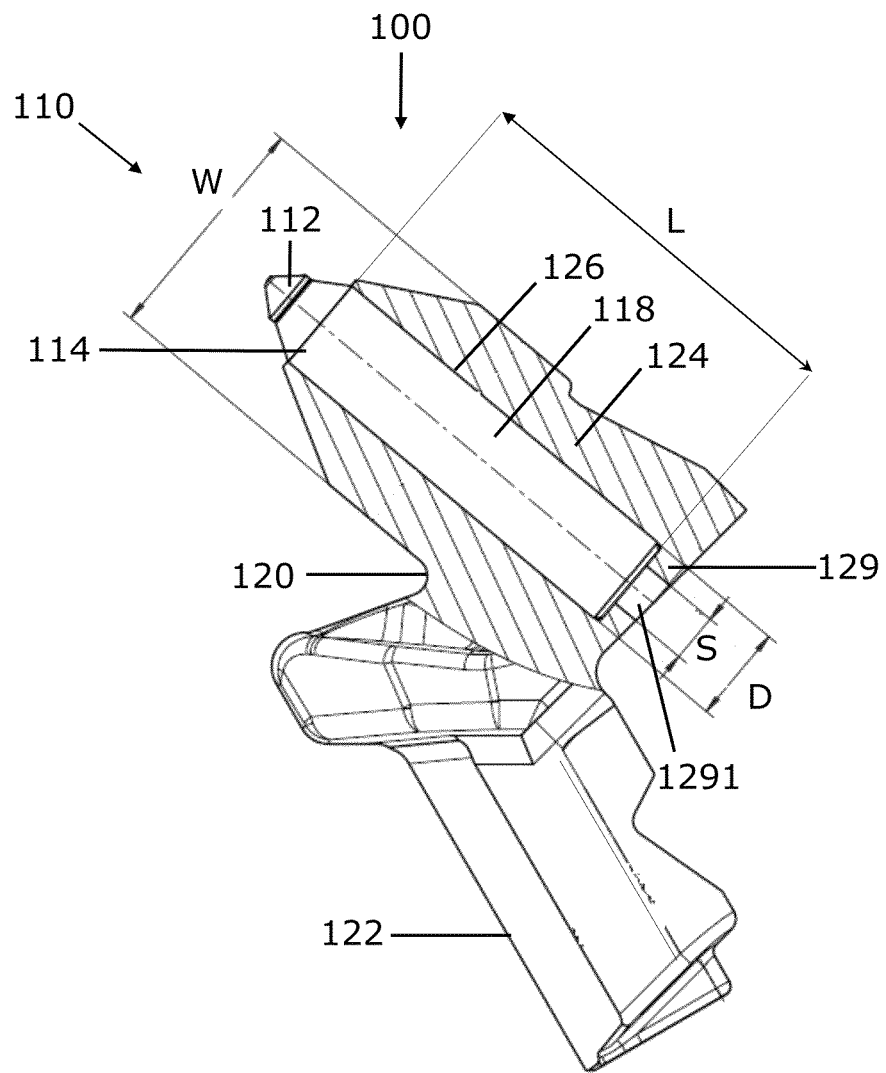
FIG. 3 shows a schematic partially cut-away side view of an example of a pick tool.

With reference to FIG. 3, a major portion of the insertion shank 118 is secured within the bore 126 of the steel holder 120 by means of a shrink fit. In this example, the insert receiver member 124 is provided with a seat 129 against which the insertion shank 118 of the support body 114 may be positioned. The seat 129 may be provided with a through-hole 1291 for facilitating extraction of the insert 112 or brazing the end of the insertion shank 118 to the seat 129. For example, the through-hole 1291 of the seat 129 may have a diameter S of at least about 0.6 cm and at most about 2 cm. The insert receiver member 124 may have an outer dimension W, which may be about 4.8 cm. In general, the greater the diameter D of the insertion shank 118 of the support body 114, the thinner the wall of the insert receiver member 124 defining the bore 126 may need to be, since the external dimensions of the steel holder 120 may be constrained by the design of the pick apparatus (not shown) or the requirements of the pick operation. For example, the thicker the wall of the insert receiver member, the more robust the pick tool is likely to be in general, but as a trade-off, the energy requirement of the operation and wear of the steel are likely to be higher.

In the examples illustrated in FIG. 1A, FIG. 2 and FIG. 4, the bore 126 may extend through the holder 120, providing a through-hole having a pair of opposite open ends (or mouths) 128. In these examples, least a portion of the insertion shank 118 may extend substantially through the insert receiver member 124.

In some examples of pick tools, the ratio of the volume of the cemented carbide support body to the volume of the superhard structure is at least about 30, at least about 40 or at least about 50. In some embodiments, the ratio of the volume of the cemented carbide support body to the volume of the superhard structure is at most about 300, at most about 200 or at most about 150. In some embodiments, the volume of the superhard structure is at least about 200 mm$^3$ or at least about 300 mm$^3$. In some embodiments, the volume of the superhard structure is at most about 500 mm$^3$ or at most about 400 mm$^3$.

In some variants of pick holders, the length of the bore may be at least equal to its diameter. In one example, the diameter of the insertion shank and the bore may be about 2.5 cm and the length of the bore and the inserted portion of the insertion shank may be about 6 cm; and therefore the volume of the bore and the inserted portion of the insertion shank may be about 29 cm$^3$ and the area of contact between the internal peripheral surface of the bore and the insertion shank may be about 47 cm$^2$. In another example, the diameter of the insertion shank and the bore may be about 2 cm and the length of the bore and the inserted portion of the insertion shank may be about 8.3 cm; and therefore the volume of the bore and the inserted portion of the insertion shank may be about 26 cm$^3$ and the area of contact between the internal peripheral surface of the bore and the insertion shank may about 52 cm$^2$. In yet another example, the diameter of the insertion shank and the bore may be about 3.5 cm and the length of the bore and the inserted portion of the insertion shank may be about 6.9 cm; therefore the volume of the bore and the inserted portion of the insertion shank may be about 66 cm$^3$ and the area of contact between the internal peripheral surface of the bore and the insertion shank may be about 76 cm$^2$.

In some examples of pick tools, the insertion shank may not be substantially cylindrical and may exhibit any of various shapes when viewed in transverse cross section. For example, insertion shank may be generally elliptical, egg-shaped, wedge-shaped, square, rectangular, polygonal or semi-circular in shape; or the cross-sectional shape of the insertion shank may vary along its length.

In some examples, the shank may have a substantially cylindrical form and may have a diameter of at least about 15 mm, at least about 20 mm, at least about 25 mm or even at least about 30 mm. In some embodiments, the shank has a diameter of at most about 20 mm, at most about 25 mm, at most about 30 mm, at most about 35 mm, or even at most about 40 mm. In some embodiments, the diameter of the shank varies by less than about 5 mm along its entire length, or the diameter is substantially invariant along its entire length.

The table below summarises certain example combinations of approximate dimensions that may be used with variants of pick tools disclosed herein. The dimensions relate to the length of the bore and the length of the inserted portion of the insertion shank, the mean diameter of the bore and of the inserted portion of the insertion shank, the minimum volume of the bore and the volume of the inserted portion of the insertion shank; and the area of contact between the peripheral internal wall of the bore and the corresponding surface of the inserted portion of the insertion shank.

|  | a | b | c | d | e | f | g |
| --- | --- | --- | --- | --- | --- | --- | --- |
| Bore length/depth L of insertion of shaft, cm | 7.0 | 7.7 | 4.9 | 6.5 | 6 | 6.5 | 6.7 |
| Bore/insertion shank diameter D, cm | 2.0 | 2.0 | 2.5 | 2.5 | 2.5 | 3.0 | 3.5 |
| Volume of bore/inserted portion of shaft, cm$^3$ | 22 | 24 | 24 | 32 | 29 | 46 | 64 |
| Area of contact of bore and insertion shank, cm$^2$ | 44 | 48 | 38 | 51 | 47 | 61 | 73 |

In some embodiments, the support body comprises a cemented carbide material having fracture toughness of at most about 17 MPa·m$^{1/2}$, at most about 13 MPa·m$^{1/2}$, at most about 11 MPa·m$^{1/2}$ or even at most about 10 MPa·m$^{1/2}$. In some embodiments, the support body comprises a cemented carbide material having fracture toughness of at least about 8 MPa·m$^{1/2}$ or at least about 9 MPa·m$^{1/2}$. In some embodiments, the support body comprises a cemented carbide material having transverse rupture strength of at least about 2,100 MPa, at least about 2,300 MPa, at least about 2,700 MPa or even at least about 3,000 MPa.

In some embodiments, the support body comprises a cemented carbide material comprising grains of metal carbide having a mean size of at most about 8 microns or at most about 3 microns. In one embodiment, the support body comprises a cemented carbide material comprising grains of metal carbide having a mean size of at least about 0.1 microns.

In some embodiments, the support body comprises a cemented carbide material comprising at most about 13 weight percent, at most about 10 weight percent, at most about 7 weight percent, at most about 6 weight percent or even at most about 3 weight percent of metal binder material, such as cobalt (Co). In some embodiments, the support body comprises a cemented carbide material comprising at least about 1 weight percent, at least about 3 weight percent or at least about 6 weight percent of metal binder.

In some examples, the support body may consist essentially of, or consist of cemented carbide material.

In some examples of pick tools, the shrink-fitting of the components may be reversible and the steel holder and/or the insertion shank may be detached and reused, which may in effect reduce the cost of the pick tool and permit extended use of the steel holder. This could be achieved by heating the steel holder in the vicinity of the bore to cause it to expand relative to the cemented carbide insertion shank, permitting the insertion shank to be removed from the bore.

A method for making a pick tool is provided, the method including providing a pick insert comprising a superhard tip joined to a cemented carbide support body at an end of the support body, the support body comprising a shank (insertion shank); providing a steel holder having a bore configured to accommodate the shank and comprising a shaft suitable for mounting the holder onto a tool carrier; and shrink-fitting the shank into the bore of the steel holder. The insertion shank may be shrink-fitted into the bore of the steel holder by heating at least the part of the steel holder including the bore to a temperature of about 350 degrees centigrade, inserting the shank into the bore of the heated holder and allowing the bore of the steel holder to cool and shrink, thereby holding the insertion shank in compression. In examples where the steel holder comprises a seat, the insertion shank may be inserted all the way into the bore so that the inserted end abuts the seat.

The interference between the insertion shank and the bore of the holder is the difference in size between them, which may be expressed as a percentage of the size. For example, in embodiments where the insertion shank (and the bore) has a generally circular cross section, the interference may be expressed as the difference in diameter as a percentage of the diameter. The dimension between the insertion shank and the bore would be expected to be selected depending at least on the diameter of the insertion shank, and may be at least about 0.002 percent of the diameter of the insertion shank. In one example, the diameter of the insertion shank is about 2.5 cm and the interference between the insertion shank and the bore is about 0.08 percent of the diameter of the insertion shank. The interference between the insertion shank and the bore may be at most about 0.3 percent of the diameter of the diameter of the insertion shank. If the interference is too great, the elastic limit of the steel material of the holder may be exceeded when the steel holder is shrink-fitted onto the onto the insertion shank, resulting in some plastic deformation of the steel adjacent the bore. If the interference is not high enough, then the shrink fit may not be sufficient for the insert to be held robustly by the holder in use.

In some versions of the method, the precise dimensions of the insertion shank and the bore may be selected such that after shrink-fitting the insertion shank into the bore, a region within the steel holder adjacent the bore is in a state of circumferential (or hoop) static tensile stress of at least about 300 MPa or at least about 350 MPa. In some embodiments, a region within the steel holder adjacent the bore is in a state of circumferential (or hoop) static tensile stress of at most about 450 MPa or at most about 500 MPa.

Figure 7:
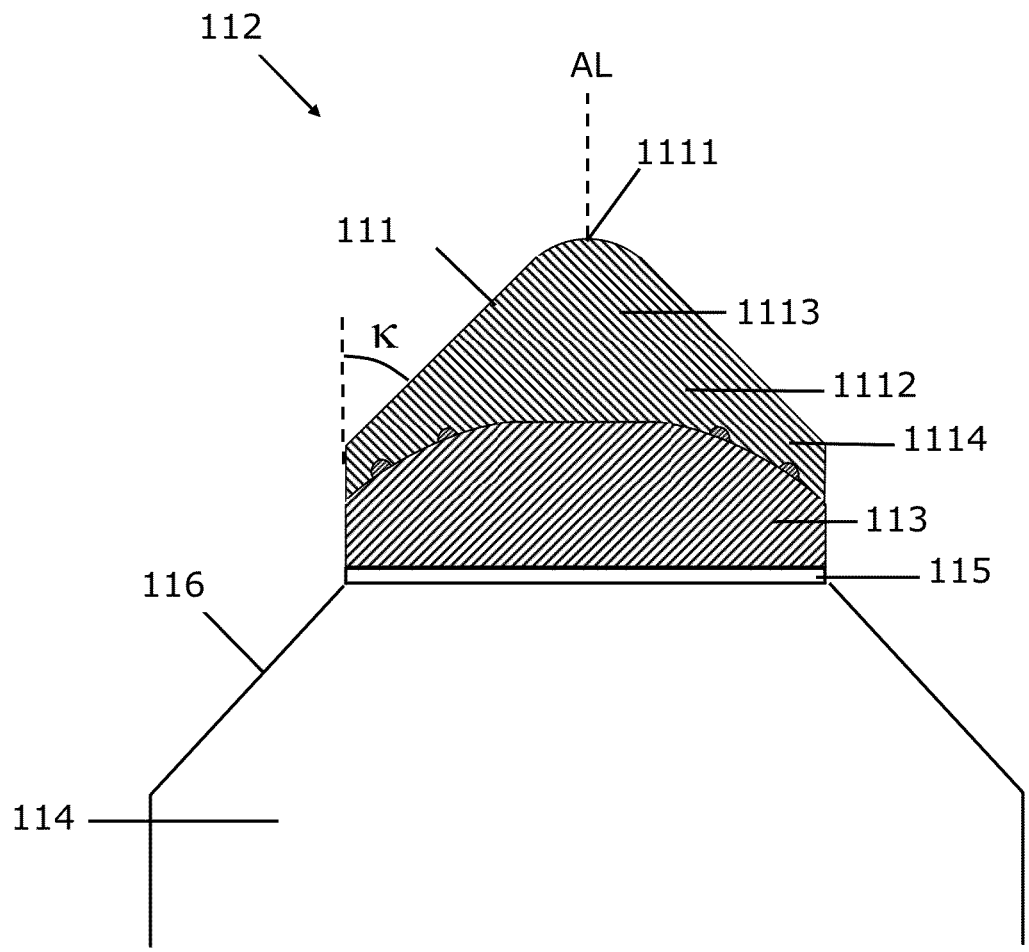
FIG. 7 shows a schematic longitudinal cross section view of the example of a superhard tip and part of the support body of any one of the example pick tools shown in FIG. 1A to FIG. 6.

As a non-limiting example, a pick tool as disclosed may comprise a superhard tip as described in United States patent application publication numbers 2009/0051211; 2010/0065338; 2010/0065339 or 2010/0071964. With reference to FIG. 7, an example of an insert for an embodiment of a pick tool as disclosed herein comprises a superhard tip 112 comprising a superhard structure 111 in the general form of a cap bonded to a cemented carbide substrate 113. The superhard tip 112 is joined to a frusto-conical portion 116 of a support body 114. The major part of the superhard structure 111 has a spherically blunted conical outer shape, having a rounded apex 1111 with a radius of curvature in a longitudinal plane, and a cone angle κ between an axis parallel to the longitudinal axis AL and conical portion 1112 of the outer surface of the superhard structure 111. The superhard structure 111 comprises a nose region 1113 and a skirt region 1114, which depends longitudinally and laterally away from the nose region 1113. In some versions of the example, the minimum longitudinal thickness of the skirt region 1114 may be at least about 1.3 mm or at least about 1.5 mm. In some versions of the example, the longitudinal thickness of the superhard cap 111 at the apex 1111 is at least about 4 mm or at least about 5 mm and at most about 7 mm or at most about 6 mm. In one version of the example, the longitudinal thickness of the superhard structure 111 at the apex 1111 is in the range from about 5.5 mm to 6 mm. In some versions of the example, the radius of curvature of the rounded apex 1111 is at least about 2 mm and at most about 3 mm. In some embodiments, the cone angle κ is at most 80 degrees or at most 70 degrees. In some versions of the example, the cone angle κ is at least 45 degrees or at least 50 degrees.

Figure 8:
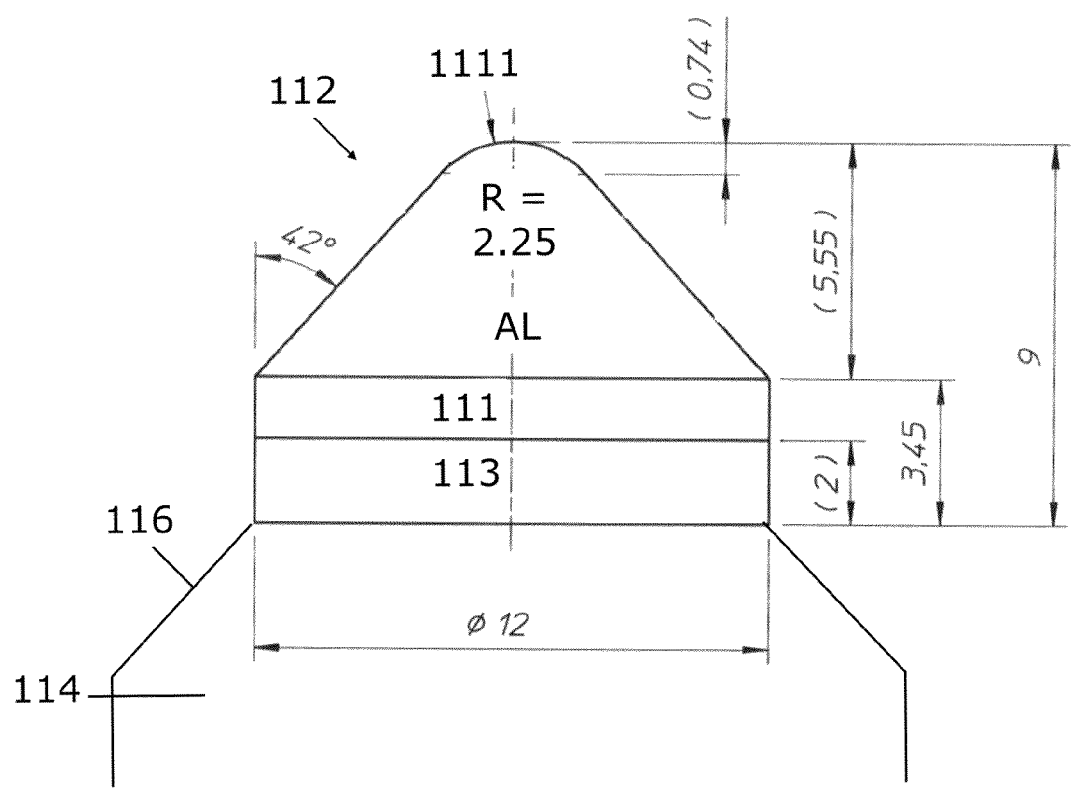
FIG. 8 shows a schematic side view of an example of a superhard tip and part of the support body of any one of the example pick tools shown in FIG. 1A to FIG. 6, in which dimensions are in millimeters and angles are in degrees.

With reference to FIG. 8, an example of an insert for an embodiment of a pick tool as disclosed comprises a superhard tip 112 comprising a superhard structure 111 bonded to a cemented carbide substrate 113. The superhard tip 112 is joined to a frusto-conical portion 116 of a support body 114. The radius of curvature R of the spherically blunted cone nose 1111 is about 2.25 mm and the cone angle κ is about 42 degrees.

Figure 9:
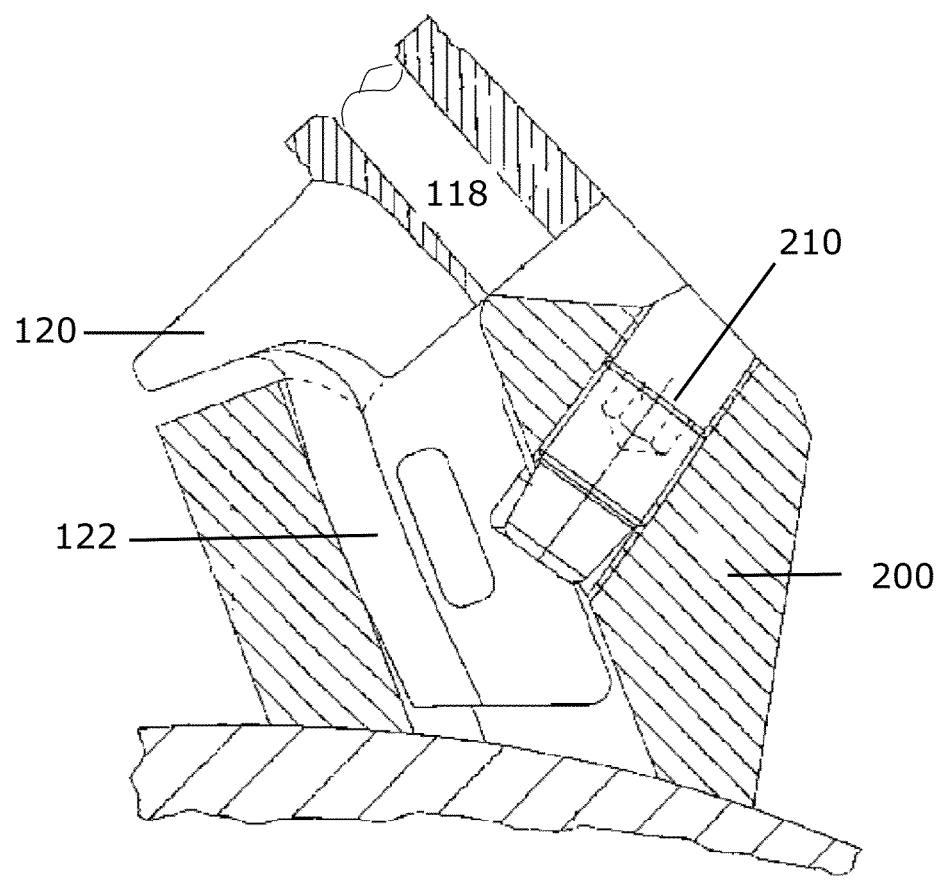
FIG. 9 shows a schematic partially cut-away side view of an example of a pick tool mounted to a carrier body, in which only a portion of the pick tool is shown.
Figure 10:
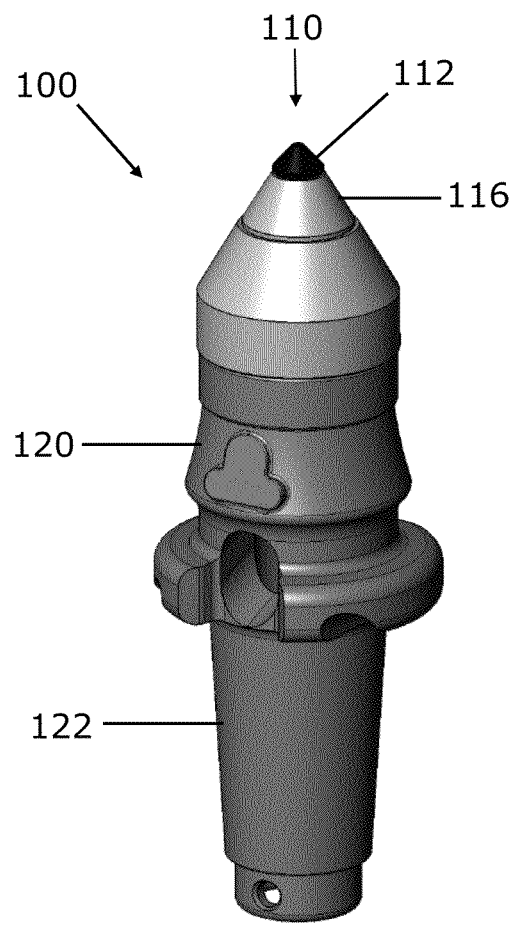
FIG. 10 shows a schematic side view an example of a pick tool for a different carrier than that illustrated in FIG. 9.

With reference to FIG. 9, a part of an example of a steel holder 120 for a pick tool as disclosed is attached to a base block 200 (carrier body) by means of an interlocking fastener mechanism 210 in which the shaft 122 of the steel holder 120 is locked within a bore formed within the carrier body 200. Part of the insertion shank 118 of an example pick tool is also shown. The shaft 122 may be releasably connectable to the base block 200 welded or otherwise joined to the drum. The base block 200 and holder 120, more specifically the shaft 122, may be configured to permit releasable inter-engagement of the steel holder 120 and base block. The shaft 122 may be configured to inter-engage non-rotationally with a base block, and may be suitable for use with tool carriers disclosed in German patents numbers DE 101 61 713 B4 and DE 10 2004 057 302 A1, for example. The tool carrier, such as a base block, may be welded onto a component of a drive apparatus, such as a drum, for driving the superhard pick tool. FIG. 10 shows a side view of a pick tool 100 for a different tool carrier than the example illustrated in FIG. 9, the shaft 122 of the steel holder 120 being configured differently. The pick tool 100 comprises an insert 110 with a superhard tip 112 joined to a portion 116 of a support body.

A method is provided for attaching a superhard pick tool to a tool carrier joined to a component for a drive apparatus, the method including joining a pick insert to a steel holder to form a pick tool, the steel holder comprising a shaft configured operable to attach the steel holder onto the tool carrier, the tool carrier comprising an engagement means configured to receive the shaft of the steel holder; and then attaching the superhard pick tool to the tool carrier. In one embodiment of the method, the tool carrier is welded onto a component of a drive apparatus, such as a drum, for driving the superhard pick tool.

In operation, the pick tool may be driven forward by a drive apparatus on which it is mounted, against a structure to be degraded and with the superhard tip at the leading end. For example, a plurality of pick tools may be mounted on a drum for asphalt degradation, as may be used to break up a road for resurfacing. The drum is connected to a vehicle and caused to rotate. As the drum is brought into proximity of the road surface, the pick tools are repeatedly impacted into the road as the drum rotates and the leading superhard tips thus break up the asphalt. A similar approach may be used to break up coal formations in coal mining.

Figure 5:
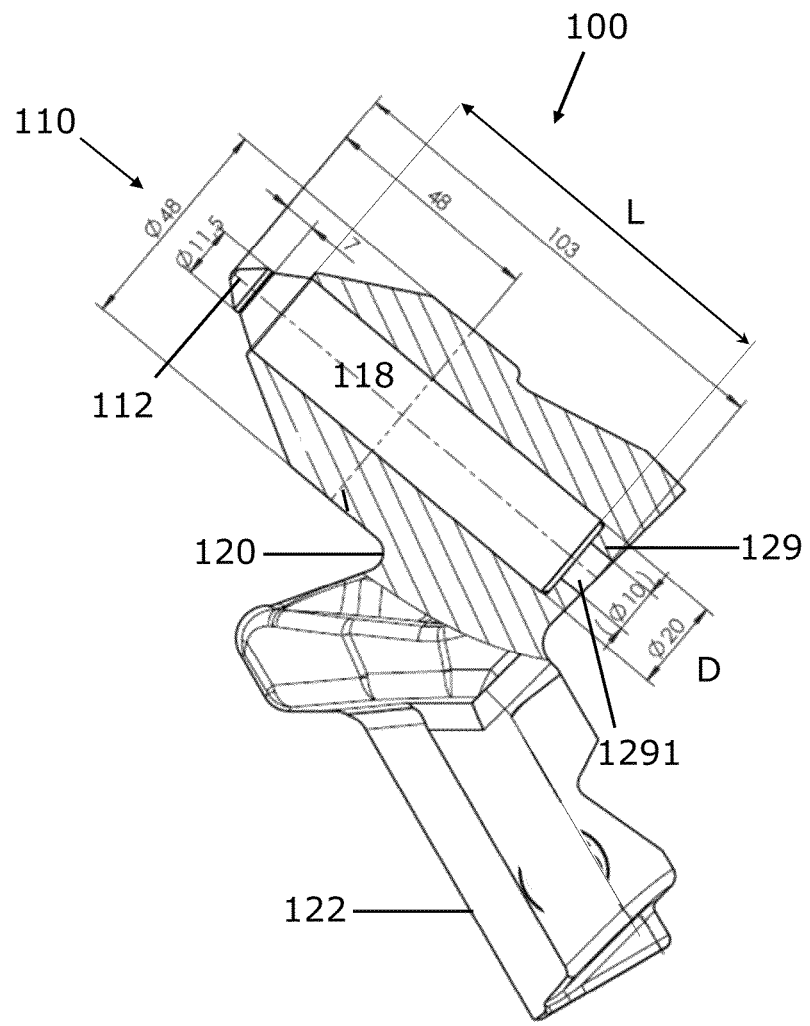
FIG. 5 shows a schematic partially cut-away side view of an example of a pick tool, in which dimensions are in millimeters.
Figure 6:
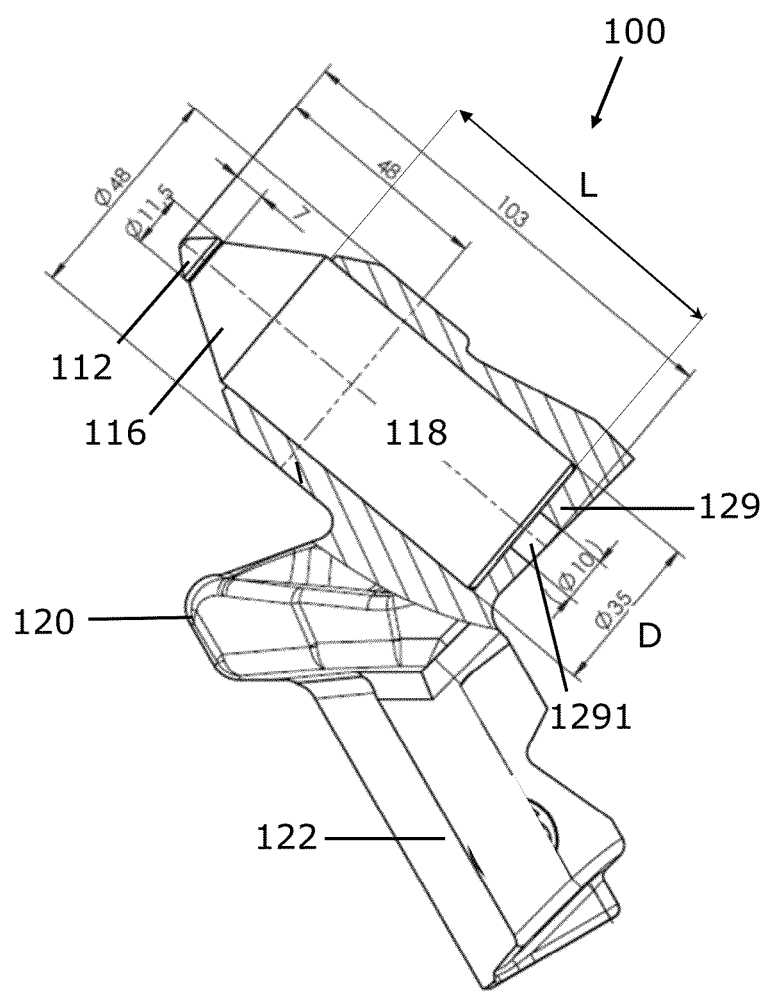
FIG. 6 shows a schematic partially cut-away side view of an example of a pick tool, in which dimensions are in millimeters.
Figure 11:
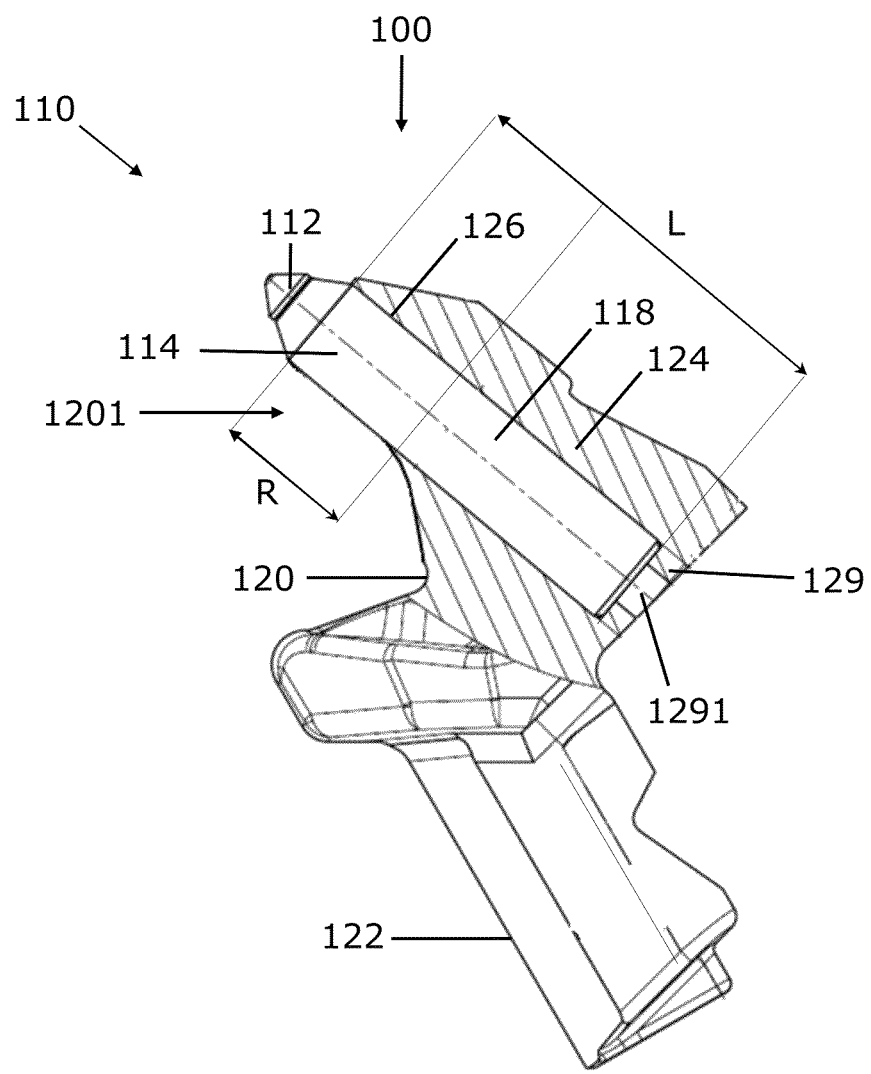
FIG. 11 shows a schematic partially cut-away side view of an example of a pick tool, with a section of the steel holder in a worn-away condition.

With reference to FIG. 11, the example pick tool illustrated in FIG. 5 is shown schematically in a worn condition, in which a part 1201 of the steel holder 120 has been worn away in use to expose part of the surface of the insertion shaft 118 to which that part 1201 had been adjacent.

Although the example pick tool illustrated in FIG. 11 is shown in a worn condition, some example pick tools may be provided with a cut-away portion 1201 prior to use. In this configuration, the insertion shank 118 is only partially surrounded by the bore 126 at a range of axial positions R along the length L of the insertion shank 118 (i.e. within the range R of axial positions, the insertion shank 118 is not entirely surrounded or enclosed by the steel holder 120).

When designing pick tools for highly abrasive operations such as asphalt, coal or potash degradation, it would be desirable to achieve a balance between the cost of the tool and its resistance to abrasive wear and fracture in use. Superhard materials such as synthetic diamond tend to be much more abrasion resistant but also much more costly than cemented carbide materials, which in turn tend to be much more abrasion resistant but much more costly than steel materials. One approach may be to minimise the amounts of diamond-containing and cemented carbide materials in the tool according to their relative costs and to configure components comprising these materials so as to achieve an acceptable tool life.

A cemented carbide support body having a relatively large volume of at least about 6 cm$^3$, at least about 10 cm$^3$ or at least about 15 cm$^3$ arranged behind the PCD tip in the direction of movement in use and extending relatively deeply into the steel holder seems to improve the working life of the tool to a surprising degree that is likely to justify additional cost of the carbide material.

While wishing not to be bound by a particular theory, the high density and relatively high mass of the carbide insertion shank, as well as its high stiffness may provide substantially improved support for the PCD tip by tending to resist deformation or bending of the tip when it is thrust against the structure being broken. The carbide insertion shank may be viewed as forming a spine-like structure extending relatively deeply into the steel holder. The elongate carbide insertion shank may also function as a stiffening spine extending into the steel holder and making it more robust.

It has been found that a superhard-tipped pick tool having the combination of a relatively large insertion shank and a shrink-fit connection of the insertion shank within the steel holder exhibits extended working life in an asphalt degradation operation. If the volume of the inserted portion of the insertion shank is less than about 6 cm$^3$ or less than about 15 cm$^3$, there may be insufficient support for the superhard tip in operation; and if the interface area between the insertion shank and the bore is less than about 20 cm$^2$, the carbide support body may not be sufficiently robustly gripped by the steel holder into which it is shrink-fitted. If the diameter of the insertion shank is less than about 2 cm, it may not provide adequate support and robustness for the tool, which may break in particularly harsh operations, and/or the steel holder may wear excessively. If the length of the support body is less than about 4 cm, it may not provide sufficient support for the steel holder and/or the PCD tip, which may fracture prematurely.

In pick tools disclosed herein, in which the volume of the insertion shank and the bore as well as the area of contact between them are relatively high, shrink-fitting the insertion shank into the steel holder may have benefits over press-fitting. Considerably less force would be required to shrink fit the relatively large insertion shank than would be needed to press it into the bore. This may have the aspect that the insert can be held securely enough within the bore of the steel holder without the elastic limit of the steel material being substantially exceeded, thereby reducing plastic deformation of the steel holder. While wishing not to be bound by a particular theory, this may have the aspect that a region of the steel holder adjacent the bore may suffer less deformation and axial stress arising from the pressing force and friction between the insertion shank and the bore surface. The insertion shank may also have reduced residual stress components, which may result in greater resistance to fracture in use. As a trade-off, shrink-fitting may require somewhat more sophisticated equipment and procedure.

Shrink-fitting may permit reduced reliance on brazing to join the insert to the steel holder. This may be particularly useful where the superhard tip comprises synthetic or natural diamond, for example polycrystalline diamond, because of reduced thermal degradation of the tip as a result of brazing, which requires the use of high temperature (diamond, particularly in PCD form, tends to have a relatively low thermal stability and to convert into graphite at high temperatures).

Additionally, brazing may need to be carried out in a special furnace and a special atmosphere, which may not be required for shrink fitting.

Example pick tools are provided. The following clauses are offered as further descriptions of the disclosed pick tools.

1. A superhard pick tool (for brevity, also referred to as a pick tool) comprising an insert and a steel holder for the insert, the insert comprising a superhard tip joined to a cemented carbide support body having an insertion shank; the steel holder comprising a shaft for connection to a tool carrier and the steel holder provided with a bore configured for receiving the insertion shank; the volume of the cemented carbide support body being at least 6 cm$^3$, at least 10 cm$^3$ or at least 15 cm$^3$.

2. A pick tool comprising an insert and a steel holder for the insert, the insert comprising a superhard tip joined to a cemented carbide support body having an insertion shank; the steel holder comprising a shaft for connection to a tool carrier and the steel holder provided with a bore configured for receiving the insertion shank; an inserted portion of the insertion shank being secured in the bore; the inserted portion having an axial length and a mean diameter; the axial length being no less than the mean diameter.

3. The pick tool of clause 2, in which the axial length of the inserted portion is at least about 4 cm and at most about 8.5 cm.

4. The pick tool of clause 2 or clause 3, in which the mean diameter of the inserted portion is at least about 2 cm and at most about 3.5 cm.

5. A pick tool comprising an insert and a steel holder for the insert, the insert comprising a superhard tip joined to a cemented carbide support body having an insertion shank; the steel holder comprising a shaft for connection to a tool carrier and the steel holder comprising an insert receiver member provided with a bore configured for receiving the insertion shank; an inserted portion of the insertion shank being secured in the bore and abutting a surface area of the bore; the magnitude of the abutted surface area being greater than the magnitude of the volume of the inserted portion.

6. The pick tool of clause 5, in which the magnitude of the abutted surface area is at least about 20 cm$^2$ and the volume of the inserted portion is at least about 15 cm$^3$.

7. The pick tool of any one of the preceding clauses, in which the insertion shank is shrink-fitted within the bore.

8. A superhard pick tool (for brevity, also referred to herein simply as "pick tool") comprising a pick insert mounted to a steel holder, the pick insert (for brevity, also referred to herein simply as "insert") comprising a superhard tip joined to a cemented carbide support body at an end of the support body, the support body comprising a shank (also referred to herein as "insertion shank"); the steel holder having a bore configured to accommodate the insertion shank and comprising a shaft configured for mounting the holder onto a tool carrier; the shank being shrink fitted within the bore of the steel holder.

9. The pick tool of any one of the preceding clauses, in which the insertion shank (shank) has a volume of at least 15 cm$^3$.

10. The pick tool of any one of the preceding clauses, in which a surface area of the insertion shank abuts a corresponding inner peripheral (side) surface area of the bore, the surface area being at least 20 cm$^2$.

11. The pick tool of any one of the preceding clauses, in which the insertion shank has a diameter (or a mean diameter) of at least 1.5 cm or at least 2 cm and at most 4.0 cm or at most 3.5 cm.

12. The pick tool of any one of the preceding clauses, in which the lengths of the insertion shank and the bore are each at least about 4 cm.
13. The pick tool of any one of the preceding clauses, in which the ratio of the volume of the cemented carbide support body to the volume of the superhard tip is at least 30 and at most 300, and the volume of the superhard tip is at least 200 mm$^3$ and at most 500 mm$^3$.
14. The pick tool of any one of the preceding clauses, in which the volume of the superhard structure is least 0.2 cm$^3$.
15. The pick tool of any one of the preceding clauses, in which at least a portion of the insertion shank is substantially cylindrical in shape.
16. The pick tool of any one of the preceding clauses, in which the bore has a length that is at least equal to its diameter.
17. The pick tool of any one of the preceding clauses, in which the interference between the insertion shank and the bore is at least about 0.002 percent of the diameter of the insertion shank and at most about 0.3 percent of the diameter of the diameter of the insertion shank.
18. The pick tool of any one of the preceding clauses, in which a region of the steel holder adjacent the bore is in a state of circumferential (or hoop) static tensile stress of at least about 300 MPa and at most about 500 MPa.
19. The pick tool of any one of the preceding clauses, in which the diameter of the insertion shank varies by less than about 5 mm along its entire length, or the diameter, and is substantially invariant along its entire length.
20. The pick tool of any one of the preceding clauses, in which a portion of the insertion shank is only partly surrounded by the bore of the steel holder (at a range of axial positions along the length of the insertion shaft).
21. The pick tool of any one of the preceding clauses, in which the steel holder is provided with a seat for supporting an end of the cemented carbide support body. The bore may communicate with the outside of the steel holder through a passage or aperture provided through or adjacent the seat.
22. The pick tool of any one of the preceding clauses, in which the bore extends through the holder, providing a through-hole having a pair of open ends.
23. The pick tool of any one of clauses 1 to 21, in which the bore is substantially closed at one end.
24. The pick tool of any one of the preceding clauses, in which a portion of the cemented carbide support body protrudes from the steel holder and extends beyond a mouth of the bore.
25. The pick tool of clause 24, in which the diameter of the protruding portion of the cemented carbide support body along the entire length of the protruding portion is at most 5% greater than the diameter of the mouth of the bore from which it protrudes.
26. The pick tool of clause 24, comprising a collar enclosing or surrounding at least part of the protruding portion.
27. The pick tool of any one of the preceding clauses, in which the insertion shank has a diameter of at least about 15 mm, at least about 20 mm, at least about 25 mm or even at least 30 mm (in some embodiments, the insertion shank may have a diameter of at most about 20 mm, at most about 25 mm, at most about 30 mm, at most about 35 mm, or even at most about 40 mm).
28. The pick tool of any one of the preceding clauses, in which the superhard tip comprises natural or synthetic diamond material or cBN material.
29. The pick tool of any one of the preceding clauses, in which the superhard tip comprises a polycrystalline diamond structure bonded to a cemented carbide substrate.
30. The pick tool of any one of the preceding clauses, in which the superhard tip comprises diamond grains dispersed in a matrix comprising SiC material, or diamond grains dispersed in a matrix comprising cemented carbide material.
31. The pick tool of any one of the preceding clauses, in which the cemented carbide support body comprises cemented carbide material having fracture toughness of at least 8 MPa·m$^{1/2}$ and at most 17 MPa·m$^{1/2}$.
32. The pick tool of any one of the preceding clauses, in which the cemented carbide support body comprises cemented carbide material comprising at most 13 weight percent and at least 1 weight percent metal binder material.
33. The pick tool of any one of the preceding clauses in which the support body comprises superhard material (for example, the support body may comprise diamond or cBN grains dispersed within a cemented carbide matrix).
34. The pick tool of any one of the preceding clauses, for pavement or road degradation, or for coal or potash mining.
35. The pick tool of any one of the preceding clauses, in which the tool carrier is welded or weldable onto a component of a drive apparatus, such as a drum, for driving the superhard pick tool.
36. The pick tool of any one of the preceding clauses, in which the tool carrier comprises or is connectable to a drive or drivable apparatus.
37. A method for making a pick tool of any one of the preceding clauses, the method including providing an insert and a steel holder for the insert, the insert comprising a superhard tip joined to a cemented carbide support body having an insertion shank; the steel holder comprising a shaft for connection to a tool carrier and the steel holder provided with a bore for receiving the insertion shank; the insertion shank having a volume of at least 6 cm$^3$, at least 10 cm$^3$ or at least 15 cm$^3$; and shrink fitting the insertion shank into the bore of the steel holder.
38. The method of clause 37, including selecting the interference between the insertion shaft and the bore such that after shrink-fitting the insertion shaft into the bore, a region within the steel holder adjacent the bore is in a state of circumferential static tensile stress of at least about 300 MPa and at most about 500 MPa, or substantially below the elastic limit of the steel material comprised in the steel holder.

A non-limiting example of a pick tool is described in more detail below.

A superhard tip comprising PCD integrally attached to a cobalt-cemented tungsten carbide (Co—WC) substrate as illustrated in FIG. 8 was brazed to a support body. The PCD structure had a volume of about 382 mm$^3$. The support body was formed of Co—WC comprising about 13 weight percent Co and having a fracture toughness of about 16.3 MPa·m$^{1/2}$ and transverse rupture strength (TRS) of at least about 2,200 MPa. In another example, the support body was formed of Co—WC comprising about 8 weight percent Co and having a fracture toughness of about 14.6 MPa·m$^{1/2}$ and transverse rupture strength (TRS) of about 2,800 MPa. The support body comprised a substantially cylindrical insertion shank and a frusto-conical end portion to which the PCD tip was brazed. The insertion shank had a surface finish in the range from about 0.04 microns Ra to about 0.5 microns Ra. The diameter of the insertion shank was 2.5 cm and its length was 6.7 cm.

A steel holder formed of 42Cr—Mo4 grade of steel and comprising an insertion receiver member with a bore was provided, the diameter of the bore being about 2.5 cm and its length being about 6.7 cm. An annular seat was provided at the bottom end of the bore. The insertion shank was shrink-fitted into the bore of the steel holder by heating the insertion receiver member of the steel holder in air to a temperature of about 350 degrees centigrade, inserting the shaft into the bore of the heated holder and allowing the insertion receiver member to shrink onto the insertion shank, thereby holding it in compression. The insertion shank was inserted all the way into the bore so that the inserted end abutted the annular seat. The volume of the inserted portion of the insertion shank was therefore about 33 cm$^3$ and the interface area between the insertion shank and the peripheral internal wall of the bore was about 53 cm$^2$. The interference between the insertion shank and the bore was about 0.02 mm and the static tensile hoop stress of the region of the steel holder adjacent the bore was estimated to be in the range from about 300 MPa to about 500 MPa.

Pick tools according to the present example have been tested in road reconditioning operations, in which they were mounted onto drums and used to degrade road asphalt. These were still in working condition after degrading at least about 20 km of road.

Various example embodiments of pick tools and methods for assembling and connecting them have been described above. Those skilled in the art will understand that changes and modifications may be made to those examples without departing from the spirit and scope of the claimed invention.

The invention claimed is:

1. A pick tool comprising an insert mounted in a steel holder, the insert comprising a superhard tip joined to a cemented carbide support body at an end of the support body, the support body comprising an insertion shank;
   the steel holder comprising a bore configured to accommodate the insertion shank and a shaft configured for mounting the steel holder onto a tool carrier, the shaft being configured to inter-engage non-rotationally with the tool carrier;
   the cemented carbide support body having a volume of at least 15 cubic centimeters (cm$^3$) and comprising cemented carbide material having fracture toughness of at least 8 megapascals times square root meter (MPa·m$^{1/2}$) and at most 17 MPa·m$^{1/2}$;
   in which an inserted portion of the insertion shank is non-rotationally secured in the bore such that the insert does not rotate relative to the shaft when the shaft is engaged with the tool carrier, the inserted portion having an axial length of at least 4 centimeters (cm) and at most 8.5 cm, and a mean diameter of at least 1.5 cm and at most 4.0 cm.

2. A pick tool as claimed in claim 1, in which the insertion shank is shrink-fitted within the bore.

3. A pick tool as claimed in claim 2, in which the interference between the insertion shank and the bore is at least 0.002 percent of the diameter of the insertion shank and at most 0.3 percent of the diameter of the insertion shank.

4. A pick tool as claimed in claim 2, in which the support body comprises cemented carbide material comprising grains of metal carbide having a mean size of at most 8 microns.

5. A pick tool as claimed claim 2, in which the superhard tip comprises diamond material.

6. A pick tool as claimed in claim 2, in which the superhard tip comprises a polycrystalline diamond (PCD) structure bonded to a cemented carbide substrate.

7. A pick tool as claimed in claim 1, in which the interference between the insertion shank and the bore is at least 0.002 percent of the diameter of the insertion shank and at most 0.3 percent of the diameter of the insertion shank.

8. A pick tool as claimed in claim 1, in which the support body comprises cemented carbide material comprising at most 10 weight percent metal binder material.

9. A pick tool as claimed in claim 8, in which the support body comprises cemented carbide material comprising grains of metal carbide having a mean size of at most 8 microns.

10. A pick tool as claimed in claim 2, in which the support body comprises cemented carbide material comprising at most 10 weight percent metal binder material.

11. A pick tool as claimed claim 10, in which the superhard tip comprises diamond material.

12. A pick tool as claimed in claim 1, in which the support body comprises cemented carbide material comprising grains of metal carbide having a mean size of at most 8 microns.

13. A pick tool as claimed claim 12, in which the superhard tip comprises diamond material.

14. A pick tool as claimed in claim 1, in which the ratio of the volume of the cemented carbide support body to the volume of the superhard tip is at least 30 and at most 300, and the volume of the superhard tip is at least 200 mm$^3$ and at most 500 mm$^3$.

15. A pick tool as claimed in claim 1, in which a surface area of the insertion shank abuts a corresponding inner side surface area of the bore, the surface area being at least 20 cm$^2$.

16. A pick tool as claimed in claim 1, in which a portion of the insertion shank is only partly surrounded by the bore of the steel holder.

17. A pick tool as claimed in claim 1, in which the steel holder is provided with a seat for supporting an end of the cemented carbide support body, and the bore communicates with the outside of the steel holder through a passage provided through or adjacent the seat.

18. A pick tool as claimed claim 1, in which the superhard tip comprises diamond material.

19. A pick tool as claimed in claim 1, in which the superhard tip comprises a polycrystalline diamond (PCD) structure bonded to a cemented carbide substrate.

20. A pick tool as claimed in claim 1, in which the superhard tip comprises diamond grains dispersed in a cemented carbide matrix.

21. A pick tool as claimed in claim 1, in which the inserted portion has a mean diameter of at least 2 cm and at most 3.5 cm.

22. A method of making a pick tool, the method including providing an insert and a steel holder for the insert, the insert comprising a superhard tip joined to a cemented carbide support body having an insertion shank;
   the steel holder comprising a shaft configured to inter-engage non-rotationally with a tool carrier and the steel holder provided with a bore for receiving the insertion shank;
   the insertion shank having a volume of at least 10 cm$^3$; and
   shrink fitting the insertion shank into the bore of the steel holder to form the pick tool;
   wherein the cemented carbide support body has a volume of at least 15 cubic centimeters (cm$^3$) and comprises cemented carbide material having fracture toughness of at least 8 megapascals times square root meter (MPa·m$^{1/2}$) and at most 17 MPa·m$^{1/2}$; and
   wherein an inserted portion of the insertion shank is non-rotationally secured in the bore such that the insert does not rotate relative to the shaft when the shaft is engaged with the tool carrier, the inserted portion having an axial length of at least 4 centimeters (cm) and at most 8.5 cm, and a mean diameter of at least 1.5 cm and at most 4.0 cm.

23. A method of disassembling a pick tool, the method including
providing an insert and a steel holder for the insert, the insert comprising a superhard tip joined to a cemented carbide support body having an insertion shank;
the steel holder comprising a shaft configured to inter-engage non-rotationally with a tool carrier and the steel holder provided with a bore for receiving the insertion shank;
the insertion shank having a volume of at least 10 cm$^3$; and
heating the steel holder to expand the bore and withdrawing the insertion shank from the bore;
wherein the cemented carbide support body has a volume of at least 15 cubic centimeters (cm$^3$) and comprises cemented carbide material having fracture toughness of at least 8 megapascals times square root meter (MPa·m$^{1/2}$) and at most 17 MPa·m$^{1/2}$; and
wherein prior to the withdrawal, an inserted portion of the insertion shank is non-rotationally secured in the bore such that the insert does not rotate relative to the shaft when the shaft is engaged with the tool carrier, the inserted portion having an axial length of at least 4 centimeters (cm) and at most 8.5 cm, and a mean diameter of at least 1.5 cm and at most 4.0 cm.

24. A pick tool comprising an insert mounted in a steel holder, the insert comprising a superhard tip joined to a cemented carbide support body at an end of the support body, the support body comprising an insertion shank;
the steel holder comprising a bore configured to accommodate the insertion shank and a shaft configured for mounting the steel holder onto a tool carrier, the shaft being configured to inter-engage non-rotationally with the tool carrier;
in which an inserted portion of the insertion shank is non-rotationally secured in the bore such that the insert does not rotate relative to the shaft when the shaft is engaged with the tool carrier, the inserted portion having an axial length of at least 4 centimeters (cm) and at most 8.5 cm, and a mean diameter of at least 1.5 cm and at most 4.0 cm.

25. A pick tool as claimed in claim 24, in which the inserted portion has a mean diameter of at least 2 cm and at most 3.5 cm.

* * * * *